United States Patent
Chopra et al.

(10) Patent No.: US 9,605,166 B2
(45) Date of Patent: Mar. 28, 2017

(54) EMULSIFIED ELECTRORHEOLOGICAL INK FOR INDIRECT PRINTING

(71) Applicant: XEROX CORPORATION, Norwalk, CT (US)

(72) Inventors: Naveen Chopra, Oakville (CA); Jennifer L. Belelie, Oakville (CA); Barkev Keoshkerian, Thornhill (CA); Michelle Chrétien, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 124 days.

(21) Appl. No.: 14/067,443

(22) Filed: Oct. 30, 2013

(65) Prior Publication Data
US 2015/0114246 A1  Apr. 30, 2015

(51) Int. Cl.
*C09D 11/023* (2014.01)
*B41M 1/42* (2006.01)
*C08K 5/11* (2006.01)
*C08K 5/3415* (2006.01)
*C08K 5/42* (2006.01)
*C08K 5/45* (2006.01)
*C09D 11/38* (2014.01)
*C08K 5/21* (2006.01)
*C08K 5/098* (2006.01)
*C08K 9/04* (2006.01)
*C08L 83/04* (2006.01)
*C08L 91/00* (2006.01)

(52) U.S. Cl.
CPC ............. *C09D 11/023* (2013.01); *C08K 5/11* (2013.01); *C08K 5/3415* (2013.01); *C08K 5/42* (2013.01); *C08K 5/45* (2013.01); *C09D 11/38* (2013.01); *B41M 1/42* (2013.01); *C08K 5/098* (2013.01); *C08K 5/21* (2013.01); *C08K 9/04* (2013.01); *C08K 2201/011* (2013.01); *C08L 83/04* (2013.01); *C08L 91/00* (2013.01)

(58) Field of Classification Search
None
See application file for complete search history.

(56) References Cited

U.S. PATENT DOCUMENTS

| | | | |
|---|---|---|---|
| 2,417,850 A | 3/1947 | Winslow | |
| 5,510,817 A | 4/1996 | Sohn | |
| 5,910,269 A * | 6/1999 | Ono | C10M 171/001 |
| | | | 252/572 |
| 6,048,050 A | 4/2000 | Gundlach | |
| 8,047,849 B2 | 11/2011 | Ahn | |
| 2007/0212122 A1* | 9/2007 | Maeyama | G03G 15/081 |
| | | | 399/267 |
| 2012/0256135 A1* | 10/2012 | Green | C10M 139/00 |
| | | | 252/500 |

(Continued)

OTHER PUBLICATIONS

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.
U.S. Appl. No. 14/067,074, filed Oct. 30, 2013, entitled "Electron Beam Curable Inks for Indirect Printing"; First Inventor: Michelle N. Chretien.

(Continued)

*Primary Examiner* — Joshua D Zimmerman
(74) *Attorney, Agent, or Firm* — Pillsbury Winthrop Shaw Pittman LLP

(57) ABSTRACT

An emulsified aqueous ink comprising an electrorheological fluid including a liquid phase and a solid phase, and a co-solvent, which is suitable for use in an indirect printing method.

13 Claims, 2 Drawing Sheets

(56) References Cited

U.S. PATENT DOCUMENTS

2013/0069022 A1    3/2013   Bussear

OTHER PUBLICATIONS

U.S. Appl. No. 14/067,054, filed Oct. 30, 2013, entitled Photocurable Inks for Indirect Printing; First Inventor: Michelle N. Chretien.
U.S. Appl. No. 14/067,152, filed Oct. 30, 2013, entitled "Curable Aqueous Latex Inks for Indirect Printing"; First Inventor: Jennifer L. Belelie.
U.S. Appl. No. 14/067,191, filed Oct. 30, 2013, entitled "Curable Latex Inks Comprising an Unsaturated Polyester for Indirect Printing"; First Inventor: Jennifer L. Belelie.
U.S. Appl. No. 14/067,240, filed Oct. 30, 2013, entitled "Emulsified Aqueous Ink Comprising Reactive Alkoxysilane for Indirect Printing"; First Inventor: Naveen Chopra.
U.S. Appl. No. 14/067,290, filed Oct. 30, 2013, entitled "Dual Component Inks Comprising Reactive Latexes for Indirect Printing"; First Inventor: Naveen Chopra.
U.S. Appl. No. 14/067,325, filed Oct. 30, 2013, entitled "Emulsified Curable Inks for Indirect Printing"; First Inventor: Daryl W. Vanbesien.
U.S. Appl. No. 14/066,716, filed Oct. 30, 2013, entitled "Ink Jet Ink for Indirect Printing Applications"; First Inventor: Jenny Eliyahu.
Hao, T. Adv. Coll. Interfac. Sci. (2002), 97, 1-35.
Wen, W; Huang, X; Yang, S; Lu, K; Sheng, P (Nov. 2003). "The giant electrorheological effect in suspensions of nanoparticles". Nature Materials 2 (11): 727-730.

\* cited by examiner

EMULSIFIED ELECTRORHEOLOGICAL INK FOR INDIRECT PRINTING

The presently disclosed embodiments are related generally to an emulsified electrorheological ink for indirect printing method.

Indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation etc.) and the resulting transient image is then transferred to the substrate.

Inks suitable for such indirect printing process may be designed and optimized to be compatible with the different subsystems, such as, jetting, transfer, etc., that enable high quality printing at high speed. Typically, inks that display good wettability do not efficiently transfer onto a final substrate, or conversely inks that transfer efficiently to the substrate do not wet the intermediate receiving member. To date, there is no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided novel phase change ink compositions comprising an emulsified electrorheological ink for use in an indirect printing process comprising an electrorheological fluid comprising a liquid phase and a solid phase; and a co-solvent; wherein the ink has a surface tension of from about 15 to about 50 mN/m, and the ink has a viscosity of from about 2 centipoise to about 20 centipoise at 30° C.

In particular, the present embodiments provide an emulsified electrorheological ink for use in an indirect printing process comprising an electrorheological fluid comprising an insulating oil and non-oxide material, wherein the electrorheological fluid is present in an amount of from about 3 weight percent to about 20 weight percent based on the weight of the ink; a co-solvent; and a colorant; wherein the ink has a surface tension of from about 15 to about 50 mN/m, and the ink has a viscosity of from about 2 centipoise to about 20 centipoise at 30° C.

In certain embodiments, there is provided a method of printing with an emulsified electrorheological ink comprising (a) providing an emulsified electrorheological ink comprising: an electrorheological fluid comprising a liquid phase and a dispersed phase; and a co-solvent; wherein the ink has a surface tension of from about 15 to about 50 mN/m, and the ink has a viscosity of from about 2 centipoise to about 20 centipoise at 30° C.; (b) applying the ink to an intermediate substrate; (c) heating the ink; (d) applying an electric field to the ink thereby forming an ink film of enhanced viscosity with aligned particles; and (e) transferring the ink film from the intermediate substrate to a final substrate.

BRIEF DESCRIPTION OF THE DRAWINGS

For a better understanding of the present embodiments, reference may be made to the accompanying figures.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments.

The present embodiments disclose emulsified electrorheological inks and their uses for an indirect print process, or indirect printing ink jet applications. The present embodiments also disclose methods of printing with emulsified electrorheological inks.

The emulsified electrorheological ink of the present embodiments may possess the required surface tension (in the range of 15-50 mN/m), viscosity (in the range of 3-20 cPs), and particle size (<600 nm) for use in an inkjet (e.g., piezoelectric) printhead.

In embodiments, the emulsified electrorheological ink has a surface tension of from about 15 mN/m to about 50 mN/m, for example from about 20 mN/m to about 40 mN/m, or from about 20 mN/m to about 30 mN/m. The surface tension can be measured with a tensiometer instrument, such as the one from Krüss.

In embodiments, the emulsified electrorheological ink has a viscosity of from about 2 cps to about 20 cps, for example from about 3 cps, to about 15 cps, or from about 4 cps to about 12 cps, at the temperature of jetting. In particular embodiments, the ink compositions are jetted at temperatures of less than about 100° C., such as from about 25° C. to about 100° C., or from about 30° C. to about 95° C., such as from about 30° C. to about 90° C.

In embodiments, the emulsified electrorheological ink has an average emulsion droplet size of less than about 600 nm, for example from about 25 nm to about 500 nm, or from about 50 nm to about 300 nm. The droplet size can be determined by dynamic light scattering.

Figure 1:
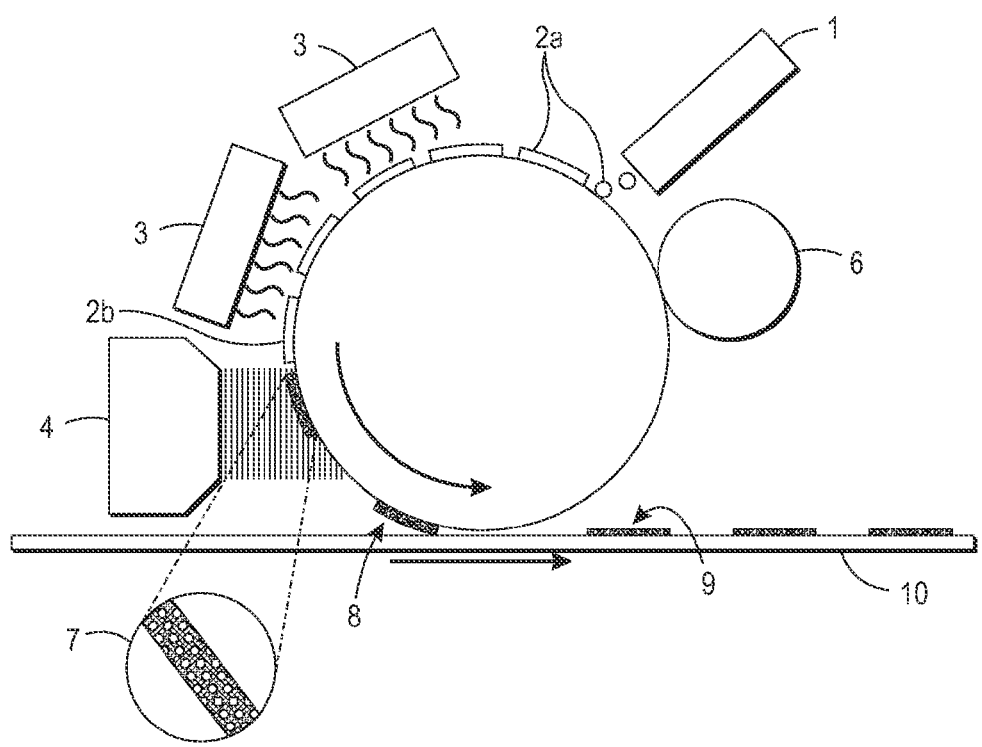
FIG. 1 is a diagrammatical illustration of an imaging member in accordance with the present embodiments for applying a two-step transfer process in an indirect printing system.
Figure 2:
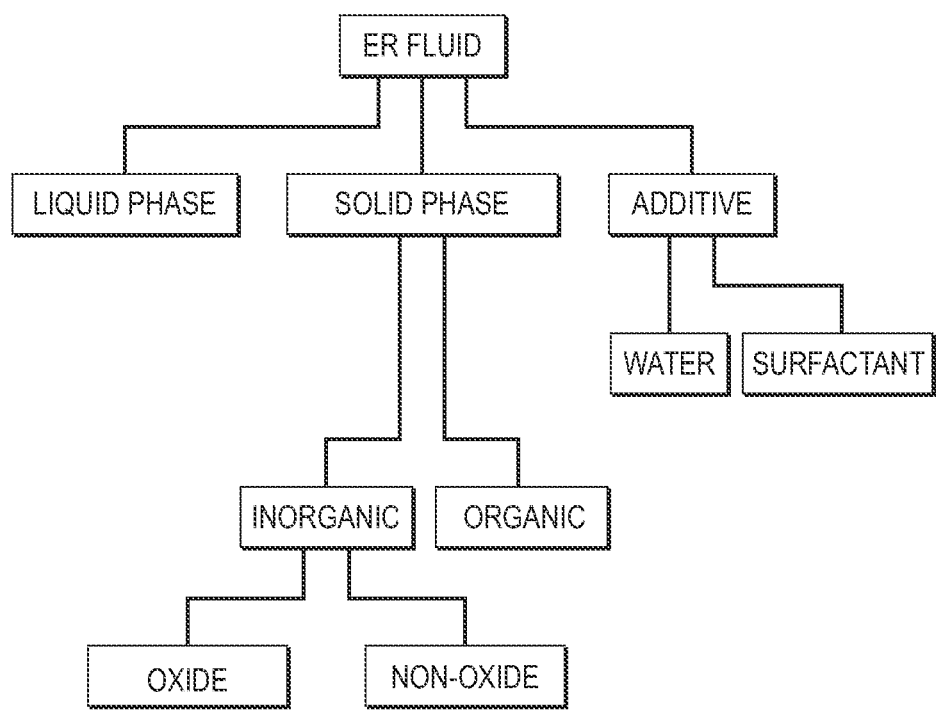
FIG. 2 is a chart illustrating the components of the ER fluid according to certain embodiments of the disclosure.

FIG. 1 discloses a diagrammatical illustration of an imaging system in accordance with the present embodiments for applying a two-step transfer printing process whereby an ink of the present disclosure is printed onto an intermediate transfer surface for subsequent transfer to a receiving substrate. During the indirect print process, the ink of the present embodiments is jetted and spread onto an intermediate receiving member 5 via an inkjet 1. The intermediate receiving member 5 may be provided in the form of a drum, as shown in FIG. 1, but may also be provided as a web, platen, belt, band or any other suitable design.

Referring again to FIG. 1, the intermediate receiving member 5 may be heated by a heater device 3 to remove the water content (partial or full) in the ink vehicle of ink 2a, leaving the non-aqueous electrorheological fluid behind. Under the influence of an electric field 4, which is applied to the ink residue 2b after the removal or partial removal of water in the ink vehicle of ink 2a but prior to the transfix step, ink particles suspended in the ink align to form fibrillated chain-like structures, this causes the ink to 'stiffen' and its viscosity and cohesive strength to increase. The resulting 'stiffened' ink 8 may then be transferred under controlled temperature and pressure from the intermediate receiving member 5 to the final receiving substrate 10.

It is important to note that an ink suitable for an indirect printing process must be able to wet the intermediate receiving member 5 to enable formation of the transient image 2, and undergo a stimulus induced property change to form image 8 to enable release from the intermediate receiving member 5 in the transfer step.

Electrorheological Fluid (ER Fluid)

The emulsified electrorheological ink of the present disclosure includes an electrorheological fluid. Electrorheological fluid is a liquid medium that exhibits a significant change in the rheological property when subjected to an electric field. Electrorheological fluids were first demonstrated by Winslow in 1947 using suspensions of starch or flour in oil. In general, electrorheological fluids include particles suspended in a dielectric fluid. The ER fluid of the present disclosure may be present in the ink in an amount of from about 3 weight percent to about 20 weight percent, from about 5 weight percent to about 17 weight percent, or from about 10 weight percent to about 15 weight percent based on the total weight of the ink. The ER fluid of the present disclosure includes a liquid phase, a solid phase, and an optional additive.

The liquid phase may include insulating oils, such as silicone oil (e.g., polydimethyl silioxane), vegetable oil (e.g., soy-bean oil, maize oil), mineral oil, paraffin, or mixtures thereof.

The solid phase may include inorganic particles, organic particles, or mixtures thereof.

Examples of the inorganic particles include, but are not limited to, metallic oxides (e.g., iron II oxide, iron III oxide, titanium dioxide, nickle oxide, cobalt oxide, tungsten oxides, zirconium dioxide, hafnium dioxide, zinc oxide, cupric/cuprous oxides, alumina, silicon dioxide), non-oxide such as aluminosilicate, ceramic materials (e.g., barium titanyl oxalate, boron nitride, titanium nitride, silicone nitride, tantalum nitride), or mixtures thereof. Ceramic materials are hard, brittle, heat- and corrosion-resistant substrates made by shaping and then heating a non-metallic mineral, such as clay, at a high temperature. A specific example of a suitable solid phase material for ER fluids is urea-coated barium titanyl oxalate particles, described in Wen, W; Huang, X; Yang, S; Lu, K; Sheng, P (November 2003). "The giant electrorheological effect in suspensions of nanoparticles". Nature Materials 2 (11): 727-730.

Examples of the organic particles include cellulosic materials, starch, polymers (e.g., oxidized polyacrylonitrile, polystyrene, poly(styrene-co(meth)acrylate) (See, Hao, T. Adv. Coll. Interfac. Sci. (2002), 97, 1-35), and mixtures thereof.

The loading of the solid phase in the liquid phase can be from about 0.1 to about 60 weight percent, from about 1 to about 50 weight percent, or from about 5 to about 45 weight percent.

The ER fluid may be anhydrous, or it may include a small amount of water as an additive. Typically, a small amount of water is considered to be essential for optimum electrorheological response, presumably by increasing the dielectric of the dispersed particle.

The ER fluid may include other additives, for example, surfactants or dispersants, or mixtures thereof. Suitable surfactants include anionic, cationic and nonionic surfactants. Anionic surfactants may include sodium dodecylsulfate (SDS), sodium dodecyl benzene sulfonate, sodium dodecylnaphthalene sulfate, dialkyl benzenealkyl, sulfate and sulfonate. In one embodiment, the anionic surfactant includes sodium dodecyl benzene sulphonate (e.g., primary branched sodium dodecyl benzene sulphonate).

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. An example of a preferred cationic surfactant is SANISOL B-50 available from Kao Corp., which consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. An example of a preferred nonionic surfactant is ANTAROX 897 available from Rhone-Poulenc Inc., which consists primarily of alkyl phenol ethoxylate.

The amount of additive present in the ER fluid may be from about 0.01 weight % to about 0.5 weight %, from about 0.02 weight % to about 0.25 weight %, or from about 0.05 weight % to about 0.10 weight % based on the total weight of the ER fluid. ER fluids are commercially available from companies such as Smart Technology Limited, or RheOil® ER-fluid (from Fluidcon GmbH, Germany)

The viscosity of the ER fluid may be from about 1 cps to about 1000, from about 2 to about 200, or from about 5 to about 50 at 22° C. The dielectric constant of the fluid used in an ER fluid may be less than 4 when measured at 1 KHz at approx. 22° C.

Co-Solvents

The ink compositions herein may include water, or a mixture of water and a water soluble or water miscible organic component, referred to as a co-solvent or humectant, such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, sulfolane, methyl ethyl ketone, isopropanol, 2-pyrrolidinone, polyethylene glycol, and mixtures thereof. When mixtures of water and water soluble or miscible organic liquids are selected as the liquid vehicle, the water to organic ratio ranges can be any suitable or desired ration, in embodiments from about 100:0 to about 30:70, from about 97:3 to about 40:60, or from about 95:5 to about 60:40. The non-water component of the liquid vehicle generally serves as a co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

Colorants

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue (CoO—Al2O3), chrome yellow (PbCrO4), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the ink composition.

Ink Composition Preparation and Use

The inks of embodiments may be prepared by any suitable technique and process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering. Further examples of ink preparation methods are set forth in the Examples below.

The ink compositions described herein may be jetted at temperatures of less than about 100° C., such as from about 25° C. to about 100° C., or from about 30° C. to about 90° C. The ink compositions are thus ideally suited for use in piezoelectric ink jet devices.

The ink compositions can be employed in indirect (offset) printing ink-jet applications, wherein when droplets of the ink are ejected in an imagewise pattern onto a recording substrate, the recording substrate is an intermediate-transfer member and the ink in the imagewise pattern is subsequently transferred from the intermediate-transfer member to a final recording substrate.

When an indirect-printing process is used, the intermediate-transfer member can be of any desired or suitable configuration, such as a drum or roller, a belt or web, a blanket, a flat surface or platen, or the like. The temperature of the intermediate-transfer member can be controlled by any desired or suitable method, such as by situating heaters in or near the intermediate-transfer member, using air flow to dry the transfer member, or the like.

It will be appreciated that varies of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of an ER Fluid 10.38 g of urea-coated barium titanyl oxalate nanoparticles (ca. 5 nm in diameter) are added to 197.32 g of Dow Corning 5cSt silicone fluid to furnish 207.7 g of ER fluid suspension containing 5 wt % loading of nanoparticles.

Example 2

Preparation of Ink Formulation A (Emulsifying ER Fluid Ink into a Mixture of Distilled Water and Humectants)

An electrorheological (ER) fluid of the present disclosure (20.8 wt %, 207.7 g) and Neogen RK™ anionic surfactant containing primarily branched sodium dodecyl benzenene sulphonate (2.0 wt %, 20 g) are added to deionized water (43.2 wt %, 432 g), sulfalone (28.3 wt %, 283 g) and 2-pyrrolidinone (5.7 wt %, 57 g) in a reactor, heated to 90° C. under pressure and stirred at about 400 RPM. The aqueous mixture containing the ER fluid is then pumped through a Gaulin 15MR piston homogenizer at about 1 liter per minute for a period of about 30 minutes with the primary homogenizing valve full open and the secondary homogenizing valve partially closed such that the homogenizing pressure is about 1,000 psi. Then, the primary homogenizing valve is partially closed such that the homogenizing pressure increases to about 8,000 psi. The reactor mixture is kept at about 90° C. and circulated through the homogenizer at about 1 L/min for about 60 minutes. Thereafter, the homogenizer is stopped and the reactor mixture is cooled to room temperature at about 15° C./min and discharged into a product container. The ER fluid is now dispersed in an aqueous ink to a droplet size of about 200 nm.

Based on experimental data disclosed in U.S. Pat. No. 9,303,135, entitled "INK JET INK FOR INDIRECT PRINTING APPLICATIONS," and U.S. patent application Ser. No. 14/067,469, entitled "INKJET INK CONTAINING POLYSTYRENE COPOLYMER LATEX SUITABLE FOR INDIRECT PRINTING," and known monomer properties, prophetic ink formulation A is predicted to demonstrate suitable viscosity (5-20 cps) and surface tension (20-22 mN/m) for jetting.

Formulation A is applied via inkjet 1 (see, FIG. 1) onto an intermediate receiving member 5 (e.g., a drum) having a surface energy of less than the liquid ink surface tension. The jetted image is then be heated to remove water and induce film formation by the ER fluid. Under the influence of an electric field, particles suspended in the ink align to form aligned fibrillated chain-like structures, causing the ink to 'stiffen' and its cohesive strength to increase. The 'stiffened' ink is then transferred to the final substrate.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An emulsified electrorheological ink for use in an indirect printing process comprising:
   an electrorheological fluid comprising a liquid phase and a solid phase, wherein the solid phase comprises an inorganic particle, wherein the inorganic particle is a metallic oxide selected from the group consisting of iron II oxide, iron III oxide, titanium dioxide, and mixtures thereof;
   water; and
   a co-solvent;
   wherein the ratio of water to co-solvent is from about 97:3 to about 40:60, and further wherein the ink has a surface tension of from about 15 to about 50 mN/m, and the ink has a viscosity of from about 2 centipoise to about 20 centipoise at 30° C.

2. The ink of claim 1, wherein the electrorheological fluid is present in an amount of from about 3 weight percent to about 20 weight percent based on the weight of the ink.

3. The ink of claim 1, wherein the liquid phase comprises an insulating oil.

4. The ink of claim 3, wherein the insulating oil is selected from the group consisting of silicone oil, vegetable oil, mineral oil, paraffin, and mixtures thereof.

5. The ink of claim 1, wherein the loading of the solid phase in the liquid phase is from about 0.1 to about 60 weight percent.

6. The ink of claim 1 further comprises a surfactant selected from the group consisting of an anionic surfactant, a cationic surfactant, or a nonionic surfactant.

7. The ink of claim 1, wherein the anionic surfactant is selected from the group consisting of sodium dodecylsulfate (SDS), sodium dodecyl benzene sulfonate, sodium dodecylnaphthalene sulfate, dialkyl benzenealkyl, sulfate and sulfonate.

8. The ink of claim 1, wherein the co-solvent is selected from the group consisting of ethylene glycol, N-methylpyrrolidone, methoxylated glycerol, ethoxylated glycerol, sulfolane, methyl ethyl ketone, isopropanol, 2-pyrrolidinone, polyethylene glycol, and mixtures thereof.

9. The ink of claim 1, wherein the ink further comprises a colorant selected from the group consisting of pigment, dye, mixtures of pigment and dye, mixtures of pigments, and mixtures of dyes.

10. The ink of claim 1, wherein the ink has an average emulsion droplet size of from about 25 nm to about 500 nm.

11. An emulsified electrorheological ink for use in an indirect printing process comprising:
   an electrorheological fluid comprising a liquid phase comprises an insulating oil and a solid phase comprises an inorganic particle being a non-oxide material that comprises barium titanyl oxalate, wherein the loading of the solid phase in the liquid phase is from about 0.1 to about 60 weight percent,
   wherein the electrorheological fluid is present in an amount of from about 3 weight percent to about 20 weight percent based on the weight of the ink;
   a co-solvent; and
   a colorant; wherein the ratio of water to co-solvent is from about 97:3 to about 40:60, and further wherein the ink has a surface tension of from about 15 to about 50 mN/m, and the ink has a viscosity of from about 2 centipoise to about 20 centipoise at 30° C.

12. A method of printing with an emulsified electrorheological ink comprising:
   a) providing an emulsified electrorheological ink comprising:
      an electrorheological fluid comprising a liquid phase and a dispersed solid phase; wherein the solid phase comprises an inorganic particle, wherein the inorganic particles is a metallic oxide selected from the group consisting of iron II oxide, iron III oxide, titanium dioxide, and mixtures thereof;
      water; and
      a co-solvent;
   wherein the ratio of water to co-solvent is from about 97:3 to about 40:60, and further wherein the ink has a surface tension of from about 15 to about 50 mN/m, and the ink has a viscosity of from about 2 centipoise to about 20 centipoise at 30° C.;
   b) applying the ink to an intermediate substrate;
   c) heating the ink;
   d) applying an electric field to the ink thereby forming an ink film of enhanced viscosity with aligned particles; and
   e) transferring the ink film from the intermediate substrate to a final substrate.

13. The method of claim 12, wherein the electrorheological fluid is present in an amount of from about 3 weight percent to about 20 weight percent based on the weight of the ink.

* * * * *